United States Patent [19]

Dabeaux et al.

[11] 4,313,915

[45] Feb. 2, 1982

[54] METHOD FOR THE MANUFACTURE OF PHOSPHORIC ACID BY THE WET PROCESS

[75] Inventors: Michel Dabeaux, Paris; Nikita Tyrtoff, La Celle St Cloud, both of France

[73] Assignee: Produits Chimiques de la Montagne Noire, Paris, France

[21] Appl. No.: 40,149

[22] Filed: May 17, 1979

Related U.S. Application Data

[63] Continuation of Ser. No. 853,423, Nov. 21, 1977, abandoned.

[30] Foreign Application Priority Data

Nov. 30, 1976 [FR] France .............................. 76 36114

[51] Int. Cl.³ .......................................... C01B 25/225
[52] U.S. Cl. .................................. 423/167; 423/319; 423/320
[58] Field of Search ............ 423/167, 319, 320, 321 R

[56] References Cited

U.S. PATENT DOCUMENTS 3,192,014  6/1965  Leyshon et al. ..................... 423/320
4,140,748  2/1979  Dri ..................................... 423/320

FOREIGN PATENT DOCUMENTS 43-19205  8/1968  Japan .................................. 423/320
1337030  11/1973  United Kingdom ............... 423/320
1356586  6/1974  United Kingdom ............... 423/167
1406884  4/1975  United Kingdom ............... 423/320

OTHER PUBLICATIONS

Slack, "Phosphoric Acid", vol. 1, Marcel Dekker, Inc., N.Y., 1968, pp. 279-284; 383-386.

*Primary Examiner*—Herbert T. Carter
*Attorney, Agent, or Firm*—Bacon & Thomas

[57] ABSTRACT

The invention relates to a method for the preparation of phosphoric acids by the wet process by reaction of at least one natural phosphate on at least one strong acid, such as, preferably, sulphuric acid, characterized in that said reaction is effected in the presence of 50 to 500 g/t of phosphate consumed, of at least one non-ionic surface-active agent obtained by condensation of 2 to 30 molecules of ethylene oxide per molecule of at least one branched fatty alcohol.

3 Claims, No Drawings

METHOD FOR THE MANUFACTURE OF PHOSPHORIC ACID BY THE WET PROCESS

This is a continuation, of application Ser. No. 853,423, filed on Nov. 21, 1977, now abandoned.

FIELD OF THE INVENTION

The present invention relates to an improved method for the preparation of phosphoric acids obtained by the wet process.

SUMMARY OF THE PRIOR ART

Known methods for preparing phosphoric acids by the wet process employ the reaction between a natural phosphate (or mixture of phosphates) and a strong acid (essentially sulphuric acid).

This reaction between a solid material and a liquid is delicate to carry out, due, inter alia, to the variable compositions of the natural phosphates used. In particular, it requires the use of finely ground phosphates and the observation of strict temperature and stirring conditions.

The main problems which may be encountered are:
more or less abundant foam formations in the reaction vats and filters;
a poor flocculation of the organic matter contained in the natural phosphates;
a more or less difficult filtration of the calcium sulphate formed.

It is known that certain surface-active additives, particularly non-ionic ones, may have a favourable effect on the first two problems mentioned hereinabove.

Applicants have found that a particular class of non-ionic surface-active derivatives made it possible to solve these first two problems, with, moreover, a very favourable influence on the filtration.

SUMMARY OF THE INVENTION

The invention therefore relates to a method for preparing phosphoric acids by the wet process, by reaction of natural phosphate (or mixture of phosphates) with a strong acid (essentially sulphuric acid), wherein said reaction is effected in the presence of 50 to 500 g/t of phosphate furnished, of at least one non-ionic surface-active agent which is a product resulting from the condensation of ethylene oxide on a hydrophobic strain chosen from the branched fatty alcohols.

The best results are obtained when the hydrophobic part of the molecule of non-ionic surface-active agent is farily short. For example, the branched fatty alcohols used may have a carbon chain of between 6 and 22 carbon atoms, but the best results are obtained for branched carbon chains of between 6 and 15 carbon atoms.

The best results are also obtained when the oxyethylated hydrophilic chain is farily short and results from the condensation of about 2 to 30 molecules of ethylene oxide on the hydrophobic strain.

The surface-active products may be used by introducing the additive in the reaction vat or vats.

The use of the surface-active agents according to the invention, modifies the shape and size of the calcium sulphate crystals and, consequently, considerably reduces the filtering times with respect to the similar products used heretofore, at equivalent concentrations.

This modification in shape and size of the crystals reduces the rate of retention of the water in the gypsum cake and facilitates washing thereof. It thus allows a better recovery of a part of the residual $P_2O_5$ included in the filtration cakes.

Furthermore, these surface-active products possess in this reactional medium a very marked anti-foam action and promote the precipitation of the organic matter contained in the natural phosphates.

These properties therefore enable productivity to be increased without any modification to the installation.

The following non-limiting examples illustrate the invention.

EXAMPLE I

Manufacture of phosphoric acid-dihydrate process reactor:Prayon type, multivats
filter with rotary table of the Bird Prayon type.

Raw materials

Florida phosphate with 29% $P_2O_5$ ground such that 50% of the particles are smaller than 150 microns
60% sulphuric acid
diluted recycled phosphoric acids,
additive according to the invention:
at least one surface-active agent resulting from the mixture of two products of condensation of ethylene oxide (average degree of ethoxylation 7 to 8 molecules) obtained from a product of condensation of 3 to 5 molecules of ethylene oxide on an oxo alcohol with 10 carbon atoms prepared from tripropylene and the product of condensation of 10 to 20 molecules of ethylene oxide on the same alcohol.

The above-mentioned additive is continuously injected into the pipe which recycles the more or less diluted phosphoric acids at the reaction vat, at a dose of 80 g/t of phosphate, after having eliminated all the currently used additives such as anti-foam agents, flocculants, filtration agents and crystalline facies modifiers.

The general conditions of the reaction are maintained, viz.:
temperature between 80° and 83° C.,
excess of sulphuric acid of between 1.5 and 2%.
The following is noted:
an average enlargement of the size of the gypsum crystals of between 20 and 50%, with respect to those observed without addition of the surface-active additive mentioned hereinabove, this enlargement is measurable by direct observation through a microscope;
a considerably increased speed of filtration of the order of 10 to 15% and a better washing of the gypsum cakes which, better dried, have a drier appearance.

The use of this surface-active agent furthermore provokes:
the complete disappearance of the foams directly observed in the reaction vat and the filters;
a precipitation of the organic matter contained in the phosphate.

This phenomenon is also visualised in the gypsum cakes at filtration, the presence of brownish, more or less flocculent aggregates which do not provoke the clogging of the filtration cake, being observed.

EXAMPLE 2

Manufacture of phosphoric acid-dihydrate process reactor:Dorr Oliver type, monovat rotary horizontal filter with pivoting cells Raw materials Talba phosphate with 35% P$_2$O$_5$,
sulphuric acid and diluted recycled phosphoric acids,
additive according to the invention:
at least one surface-active agent resulting from the mixture of several products of condensation of ethylene oxide (average degree of ethoxylation 11 to 13 molecules) on a mixture of branched fatty alcohols (average fatty chain length equivalent to 10 carbon atoms).

The additive mentioned hereinabove is continuously injected into the pipe which recycles the more or less diluted phosphoric acids at the reaction vat, at a dose of 75 g/t of phosphate.

In this industrial example, the functioning of the unit without any additive is compared with its functioning with the surface-active agent described hereinabove.

The following is noted:
a very substantial increase in the speed of filtration assessed by the following observation.

In the absence of additive, a large number of cells of the filter are incompletely emptied of the filtration fluid.

By using the additive described hereinabove, gypsum cakes are observed which are perfectly exempt of any residual liquid, even before the end of each suction phase.

EXAMPLE 3

Manufacture of phosphoric acid-dihydrate process reactor:multivats
filters with buckets on conveyor belt, Giorgini type Raw materials Florida phosphate with 31.8% P$_2$O$_5$
sulphuric acid and diluted recycled phosphoric acids
additive according to the invention:
the same as in Example 1.

The additive is continuously injected into the first reaction vat at a dose of 90 g/t of phosphate after having eliminated all the currently used additives such as anti-foam agents, flocculants, filtration agents and crystalline facies modifiers.

The following is noted:
an increase in the size of the gypsum crystals and in the speed of filtration of the order of 10 to 15%; the gypsum cake appears drier;
the disappearance of the foams in the reaction vats and the filters;
a satisfactory separation of the organic matter contained in the phosphate.

As these improvements obtained with one additive have enabled the productivity to be increased.

What is claimed is:
1. A method for the preparation of phosphoric acids by the wet process by reacting at least one natural phosphate with sulphuric acid and subsequently obtaining a calcium sulfate dihydrate which is separated, wherein said reaction is effected in the presence of 50 to 500 g/t of phosphate consumed, of at least one non-ionic surface active agent, obtained by condensation of 2 to 30 molecules of ethylene oxide per molecule of at least one branched fatty alcohol of which the aliphatic chain comprises 6 to 22 carbon atoms.

2. The method of claim 1, wherein said fatty alcohol is branched alcohol whose chain has 6 to 15 carbon atoms.

3. The method of claim 2, wherein said fatty alcohol is an oxo alcohol with 10 carbon atoms prepared from tripropylene.

* * * * *